(12) United States Patent
Kim et al.

(10) Patent No.: US 11,170,081 B2
(45) Date of Patent: Nov. 9, 2021

(54) SYSTEM FOR VERIFYING CONTROL HISTORY OF UNMANNED AERIAL VEHICLE

(71) Applicants: 4DREAM CO., LTD., Andong-si (KR); Won-Kug Kim, Andong-si (KR); Jin-Kyo Shin, Seongnam-si (KR)

(72) Inventors: Won-Kug Kim, Andong-si (KR); Jin-Kyo Shin, Seongnam-si (KR); Ki-Il Ryu, Chuncheon-si (KR); Kwang-Rae Kim, Seoul (KR); Haes-Sal Jeon, Andong-si (KR)

(73) Assignee: 4DREAM CO., LTD., Andong-si (KR)

( * ) Notice: Subject to any disclaimer, the term of this patent is extended or adjusted under 35 U.S.C. 154(b) by 319 days.

(21) Appl. No.: 16/335,347

(22) PCT Filed: Sep. 29, 2017

(86) PCT No.: PCT/KR2017/010931
§ 371 (c)(1),
(2) Date: Mar. 21, 2019

(87) PCT Pub. No.: WO2018/062936
PCT Pub. Date: Apr. 5, 2018

(65) Prior Publication Data
US 2019/0236246 A1    Aug. 1, 2019

(30) Foreign Application Priority Data
Sep. 30, 2016 (KR) .................. 10-2016-0126447

(51) Int. Cl.
*H04L 29/06* (2006.01)
*G06F 21/31* (2013.01)
(Continued)

(52) U.S. Cl.
CPC .............. *G06F 21/31* (2013.01); *G06F 21/45* (2013.01); *G06F 21/60* (2013.01); *G06F 21/602* (2013.01);
(Continued)

(58) Field of Classification Search
CPC ..... G06F 21/31; G06D 1/0088; B64C 39/024; B64C 2201/141; H04L 2463/082
See application file for complete search history.

(56) References Cited

U.S. PATENT DOCUMENTS

| 9,545,995 B1 * | 1/2017 | Chau ..................... B64C 39/024 |
| 10,121,117 B1 * | 11/2018 | Boyd ..................... G08G 5/025 |
| 2017/0148340 A1 * | 5/2017 | Popa-Simil ............ G09B 9/085 |

FOREIGN PATENT DOCUMENTS

| JP | 2001-283400 A | 10/2001 |
| KR | 10-2011-0128683 A | 11/2011 |

(Continued)

OTHER PUBLICATIONS

Korean Office Action issued in KR 10-2016-0126447 dated Nov. 30, 2016.
(Continued)

*Primary Examiner* — Jason K Gee
(74) *Attorney, Agent, or Firm* — Sughrue Mion, PLLC (57) ABSTRACT

A system for verifying control history of an unmanned aerial vehicle according to one embodiment of the present disclosure includes an authentication unit for collecting personal information from a pilot who controls an unmanned aerial vehicle to authenticate the pilot, a storage unit storing control information regarding the pilot's control of the unmanned aerial vehicle, and an encryption unit for sealing and encrypting data of the personal information and the control information; and is capable of controlling and managing an indiscriminate use of the unmanned aerial vehicle (Continued)

and providing a control time, flight history, etc., to an organization which needs such information.

3 Claims, 5 Drawing Sheets

(51) Int. Cl.
*H04L 9/32* (2006.01)
*G06F 21/60* (2013.01)
*G06F 21/62* (2013.01)
*G06F 21/45* (2013.01)

(52) U.S. Cl.
CPC .......... *G06F 21/62* (2013.01); *G06F 21/6245* (2013.01); *H04L 9/32* (2013.01); *H04L 9/321* (2013.01)

(56) References Cited

FOREIGN PATENT DOCUMENTS

| | | |
|---|---|---|
| KR | 10-2014-0137826 A | 12/2014 |
| KR | 10-2016-0043705 A | 4/2016 |
| KR | 10-2016-0082213 A | 7/2016 |

OTHER PUBLICATIONS

International Search Report of PCT/KR2017/010931 dated Feb. 1, 2018.

* cited by examiner

SYSTEM FOR VERIFYING CONTROL HISTORY OF UNMANNED AERIAL VEHICLE

TECHNICAL FIELD

Embodiments of the present disclosure relate to a system for verifying control history of an unmanned aerial vehicle, which is capable of verifying information regarding a pilot and encrypting, managing and verifying the pilot's flight history so that a substitute cannot control the unmanned aerial vehicle in place of the pilot.

BACKGROUND ART in general, an unmanned aerial vehicle refers to an unmanned airplane or helicopter-like vehicle, also called a drone, which is configured to be flown by induction of radio waves.

Such unmanned aerial vehicles have been used in various industrial fields. In more detail, they have been conventionally used for military or hobby purposes but have recently been widely used, ranging from the transportation industry to the movie or broadcasting industry. Aerial vehicles having various sizes and performances have been developed according to purposes of use. In particular, unmanned aerial vehicles are used in areas that are not accessible to humans, such as jungles, the backwoods, volcanic areas, natural disaster areas, or nuclear power plant accident areas.

An unmanned aerial vehicle may be used to remotely monitor a specific region through a camera or a sensor mounted thereon while moving freely and quickly along a predetermined route. Furthermore, the unmanned aerial vehicle may be connected to a control device or a pilot terminal via wire or wirelessly so as to be flown and to monitor a specific region by capturing images according to a command transmitted from the control device or the pilot terminal. Here, the control of the unmanned aerial vehicle through the control device is performed at a short distance of about several hundred meters or less.

In this case, a pilot using the unmanned aerial vehicle sets a route in advance via the control device or the pilot terminal, flies the unmanned aerial vehicle to a desired region to spray agricultural pesticide or perform delivery, and capture a picture or video of the desired region.

However, with the spread of a large number of unmanned aerial vehicles, there are problems that pilots fly unmanned aerial vehicles in areas requiring privacy, such as security facilities, power plants, and military facilities, without permission or illegally capture images or videos by trespassing on private land.

There is neither countermeasure for monitoring, controlling and managing pilots who commit such illegal activities nor a system providing an ultra-light aircraft control certificate or reference data for drone-linked insurance. Therefore, it is difficult to view objective data, such as a pilot's drone control time and flight history, when an accident occurs due to use of an unmanned aerial vehicle, and accidents may continuously occur due to difficulty in recognizing places of frequent accidents and dangerous areas.

Furthermore, a procedure for issuance and evaluation for acquiring an unmanned aerial vehicle pilot license is not systemized, and thus, an evaluator's subjective judgment may lead to fairness degradation, cheating, and unclear administrative actions. Due to the absence of a function of authenticating non-repudiation of a control device, a substitute other than a pilot can control an unmanned aerial vehicle instead to falsify the pilot's control history, accident-free career, etc. Accordingly, the reliability and objectivity of flight license acquisition standard or flight history data are low.

Accordingly, as the demand to control and limit indiscriminate operation of unmanned aerial vehicles by a large number of pilots is increasing, there is a need for a system for verifying control history of an unmanned aerial vehicle to manage and support pilots' flight history while ensuring conditions for safe operation of unmanned aerial vehicles.

DETAILED DESCRIPTION OF THE INVENTION

Technical Problem

The present disclosure is directed to a system for verifying control history of an unmanned aerial vehicle, which is capable of controlling and managing indiscriminate use of an unmanned aerial vehicle and providing information related to flight history to organizations requiring a flight time, flight history, etc.

The present disclosure is directed to preventing illegal activities, such as control of an unmanned aerial vehicle on behalf of a pilot, and repudiation thereof.

The present disclosure is directed to sealing and encrypting data transmitted from a pilot terminal to protect the data when information leakage occurs and to store reliable data for a record of control of an unmanned aerial vehicle.

Technical Solution

To address the above problems, a system for verifying control history of an unmanned aerial vehicle according to an embodiment of the present disclosure includes a pilot terminal having an authentication unit configured to collect personal information from a pilot who controls the unmanned aerial vehicle to authenticate the pilot, a storage unit storing control information regarding the pilot's control of the unmanned aerial vehicle, and an encryption unit configured to seal and encrypt data of the personal information and the control information, In one embodiment, the pilot terminal may further include a communication unit configured to transmit the encrypted data to a flight history verification server. The flight history verification server may receive flight information from the unmanned aerial vehicle in real time or collect data stored in the unmanned aerial vehicle, and provide a reliable data management function for a record of control of the unmanned aerial vehicle.

In one embodiment, the flight history verification server may perform verification by comparing the encrypted data of the control information of the unmanned aerial vehicle with previously stored registration information.

In one embodiment, the authentication unit may include a sensor unit configured to sense the personal information via sensors thereof, and a shooting unit configured to capture an image or video of the pilot who controls the unmanned aerial vehicle.

In one embodiment, the pilot terminal may further include a search link unit configured to be operated in conjunction with the flight history verification server via a network to search for an optimum flight path for the unmanned aerial vehicle, and an automatic flight setter configured to receive an automatic control signal from the flight history verification server to cause the unmanned aerial vehicle to be automatically flown without the pilot's control.

Advantageous Effects of the Invention

A system for verifying control history of an unmanned aerial vehicle according to one or more embodiments of the present disclosure configured as described above is capable of controlling and managing indiscriminate use of an unmanned aerial vehicle, and providing information related to flight history to an organization that needs an evaluation of an unmanned aerial vehicle control license or a control time and flight history.

Furthermore, illegal acts, such as repudiation of illegal control of an unmanned aerial vehicle, e.g., control of the unmanned aerial vehicle in place of a pilot, can be blocked.

In addition, data transmitted from a pilot terminal is sealed and encrypted and thus can be protected when information leakage occurs, and the reliability thereof can be secured.

MODE OF THE INVENTION

Hereinafter, a system for verifying control history of an unmanned aerial vehicle according to the present disclosure will be described in more detail with reference to the accompanying drawings. As used herein, terms such as "module" and "unit" used to describe elements are selected or interchangeably used only for convenience of explanation and thus should not be understood as having different meanings or roles. In this specification, the same or similar reference numerals are given to even different embodiments having the same or similar configurations and are not redundantly described herein. As used herein, the singular forms "a", "an" and "the" are intended to include the plural forms as well, unless the context clearly indicates otherwise.

It should be understood that the drawings herein illustrate conceptual aspects of exemplary circuits embodying the principles of the present disclosure. That is, it should be understood that functions illustrated in the drawings may be substantially represented via a computer-readable medium and may be performed by various processes by a computer or a processor regardless of whether or not the computer or the processor is explicitly shown.

Each of the functions may be provided by use of hardware capable of executing software in association with appropriate software, as well as dedicated hardware. When provided by a processor, the functions may be provided by a single dedicated processor, a single shared processor, or a plurality of individual processors, some of which may be shared.

In the following description, well-known functions or constructions are not described in detail since they would obscure the present disclosure in unnecessary detail. Hereinafter, exemplary embodiments of the present disclosure will be described in detail with reference to the accompanying drawings.

Figure 1:
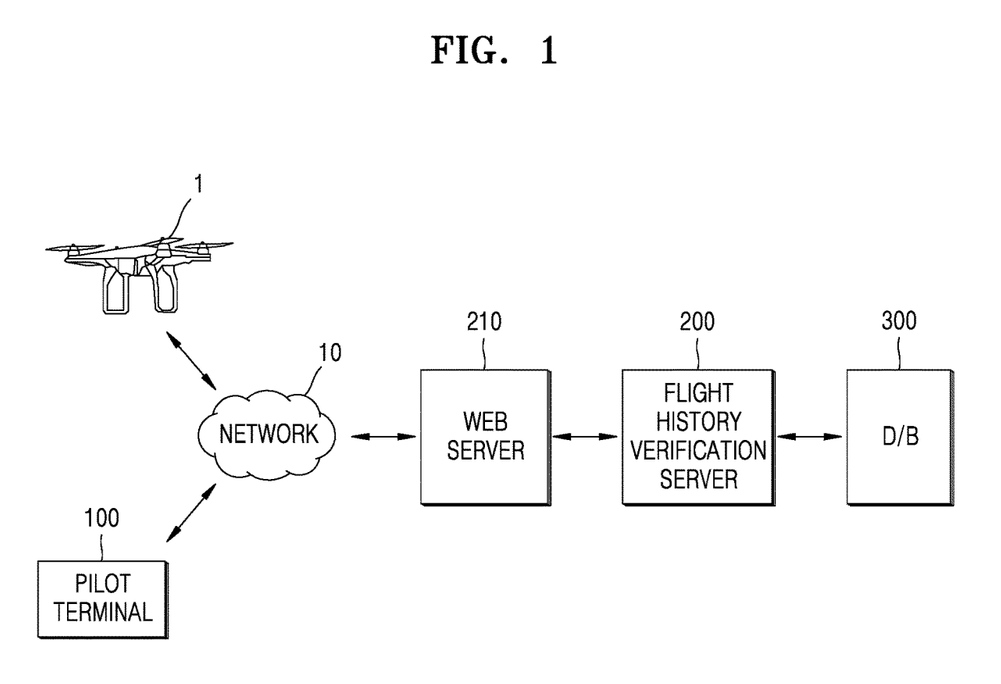
FIG. 1 is a conceptual diagram of a system for verifying control history of an unmanned aerial vehicle, according to an embodiment of the present disclosure.

FIG. 1 is a conceptual diagram of a system 1000 for verifying control history of an unmanned aerial vehicle, according to an embodiment of the present disclosure.

Referring to FIG. 1, the system 1000 includes an unmanned aerial vehicle 1, a pilot terminal 100, and a flight history verification server 200.

The unmanned aerial vehicle 1 is configured to be remotely controlled through the pilot terminal 100 without a person on board, and captures an image by a camera (not shown) included therein, detects flight information through each sensor thereof, and stores the flight information. Here, the flight information is information including at least one of a flight position, a bearing, speed, acceleration, a rotation angle, taking off/landing, a flight path, a flight direction, and an altitude.

In more detail, the unmanned aerial vehicle 1 is controlled through wireless communication with the pilot terminal 100, and at the same time, transmits an aerial shot to the pilot terminal 100 and transmits the flight information including at least one among speed, acceleration, a rotation angle, flight time information, an altitude, and location information to the flight history verification server 200 via wireless communication.

Here, the wireless communication may be satellite communication but is not limited thereto. Wireless communication may be established between the unmanned aerial vehicle 1 and the flight history verification server 200, between the unmanned aerial vehicle 1 and the pilot terminal 100, and between the pilot terminal 100 and the flight history verification server 200 by at least one selected from the group consisting of a LAN, a Metropolitan Area Network (MAN), a Global System for Mobile Network (GSM), an Enhanced Data GSM Environment (EDGE), a High-Speed Downlink Packet Access (HSDPA), Wideband Code Division Multiple Access (W-CDMA), Code Division Multiple Access (CDMA), Time Division Multiple Access (TDMA), Bluetooth, ZigBee, Voice over Internet Protocol (VoIP), LTE Advanced, IEEE 802.16m, Wireless MAN-Advanced, HSPA+, 3GPP Long-Term Evolution (LTE), Mobile WiMAX (IEEE 802.16e), UMB (formerly, EV-DO Rev. C), Flash-OFDM, iBurst and MBWA (IEEE 802.20) systems, HIPERMAN, Beam-Division Multiple Access (BDMA), Wi-MAX (World Interoperability for Microwave Access), and ultrasound-based communication.

A structure of the pilot terminal 100 will be described with reference to FIGS. 2 and 3 below.

Figure 2:
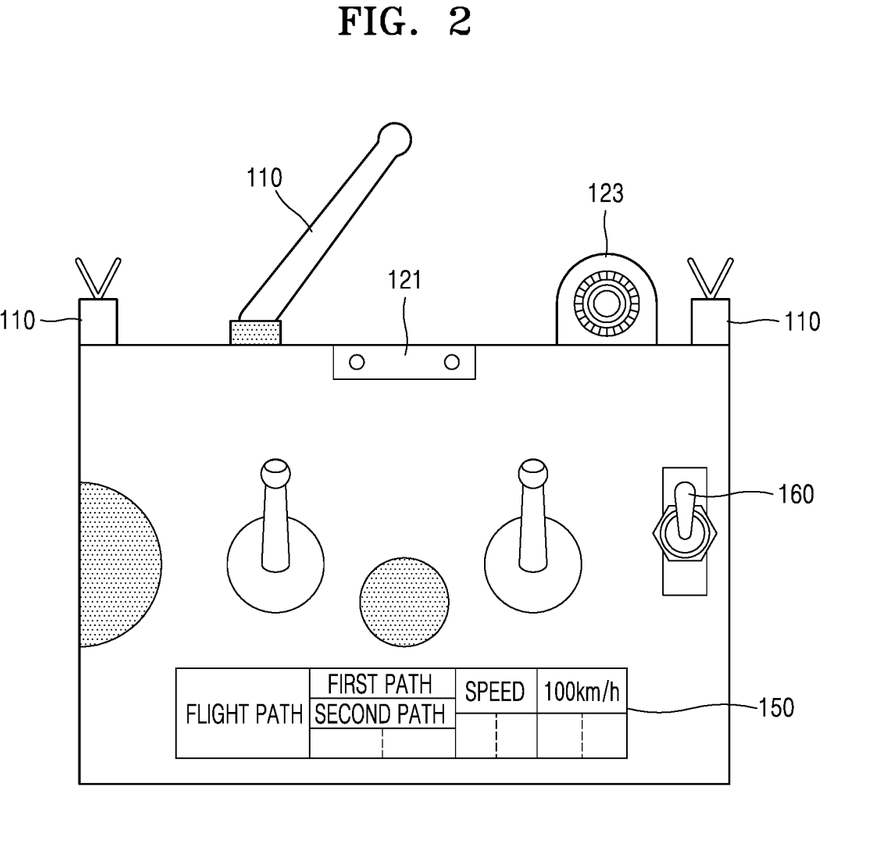
FIG. 2 is a diagram illustrating a pilot terminal of FIG. 1 according to an embodiment.

FIG. 2 is a diagram illustrating the pilot terminal 100 of FIG. 1 according to an embodiment of the present disclosure. FIG. 3 is a block diagram of a pilot terminal according to an embodiment of the present disclosure.

Figure 3:
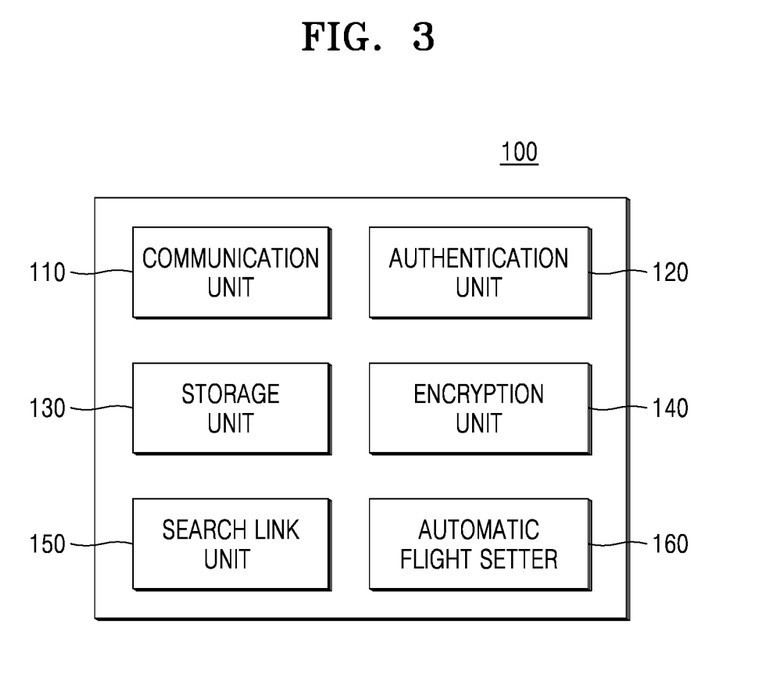
FIG. 3 is a block diagram of a pilot terminal according to an embodiment of the present disclosure.

Referring to FIGS. 1 to 3, the pilot terminal 100 is a drone-dedicated control terminal formed to remotely control the unmanned aerial vehicle 1 or to control or manipulate one of functions of the unmanned aerial vehicle 1. For example, the pilot terminal 100 includes an ultra-high frequency (UHF)/very-high-frequency (VHF) transceiver that transmits and receives data at the same frequency to remotely control the unmanned aerial vehicle 1.

In one embodiment, the pilot terminal 100 includes a communication unit 110, an authentication unit 120, a storage unit 130, an encryption unit 140, a search link unit 150, and an automatic flight setter 160.

The communication unit 110 establishes bi-directional communication by being connected to the flight history verification server 200 through a network 10.

In more detail, the communication unit 110 communicates with the flight history verification server 200 by receiving a web page or an application provided from the flight history verification server 200 via the network 10 and receiving data, such as a unique identification number of the unmanned aerial vehicle 1 or a pilot registration number, from a pilot via the pilot terminal 100 through the web page or the application.

Here, the network 10 refers to a worldwide open computer network architecture providing TCP/IP protocol and a plurality of services at upper layers thereof, such as Hyper Text Transfer Protocol (HTTP), Telnet, File Transfer Protocol (FTP), a Domain Name System (DNS), Simple Mail Transfer Protocol (SMTP), Simple Network Management Protocol (SNMP), Network File Service (NFS), Network Information Service (NIS), etc.; and provides an environment in which a pilot who owns the pilot terminal 100 may access the flight history verification server 200 and/or a web server 210 which will be described below. The network 10 may be a wired or wireless Internet, or may be a core network integrated with a wired public network, a wireless mobile communication network, or a portable Internet.

In one embodiment, the pilot terminal 100 includes a mobile terminal equipment establishing communication via the wireless Internet or the mobile Internet, e.g., a cellular phone, a Personal Communications Services (PCS) phone, or a synchronous/asynchronous International Mobile Telecommunication-2000 (IMT-2000). In addition, the pilot terminal 100 comprehensively refers to all wired/wireless home appliances/communication devices having a pilot interface for connecting to the web server 210, e.g., a palm personal computer (PC), a personal digital assistant (PDA), a smart phone, a wireless application protocol (WAP) phone, a mobile play-station, a PDA phone, a Digital Multimedia Broadcasting (DMB) phone having a communication function, a tablet PC, or an iPad.

That is, the pilot terminal 100 should be understood to include various types of wired/wireless communication devices capable of being connected to the flight history verification server 200 via the network 10 to use various web services.

The authentication unit 120 collects personal information from the pilot who controls the unmanned aerial vehicle to authenticate the pilot.

In more detail, the authentication unit 120 includes a sensor unit 121 configured to sense the pilot's personal information via sensors (not shown) thereof, and a shooting unit 123 configured to captures, in real time, an image or video of the pilot who controls the unmanned aerial vehicle 1. Here, the sensor unit 121 is a device identifying the pilot using the pilot's fingerprint or iris or a smart card, and the shooting unit 123 is a device embodied in the form of a black box having a camera mounted thereon.

That is, the authentication unit 120 collects the personal information of the pilot who controls the unmanned aerial vehicle 1 to authenticate the pilot via at least one of the sensor unit 121 and the shooting unit 123.

In one embodiment, the authentication unit 120 collects the personal information sensed by the sensing unit 121 and the image or video captured by the shooting unit 123 for two-factor authentication of the pilot via the sensing unit 121 and the photographing unit 123.

The storage unit 130 stores control information regarding the pilot's control of the unmanned aerial vehicle 1. Here, the control information is flight information, for flight control, including at least one among a flight position, a bearing, speed, acceleration, a rotation angle, taking-off/landing, a flight path, a flight direction, and an altitude.

In one embodiment, the storage unit 130 stores at least one of the personal information and the image or video which are collected by the authentication unit 120.

For example, the storage unit 130 is embodied as a volatile memory or a nonvolatile memory. Here, the volatile memory is embodied as a dynamic random access memory (DRAM), a static RAM (SRAM), a thyristor RAM (T-RAM), a zero capacitor RAM (Z-RAM), a twin transistor RAM (TTRAM), or the like. The nonvolatile memory is embodied as an electrically erasable programmable read-only memory (EEPROM), a flash memory, a magnetic RAM (MRAM), a spin transfer torque MRAM, a ferroelectric RAM (FeRAM), a phase change RAM (PRAM), a resistive RAM, a nanotube RRAM, a polymer RAM (PoRAM), a nano floating gate memory (NFGM), a holographic memory, a molecular electronics memory device, or an insulator resistance change memory.

The encryption unit 140 seals and encrypts data of at least one of the personal information and the image or video collected by the authentication unit 120 and data of the control information stored in the storage unit 130.

In more detail, the encryption unit 140 generates forgery/falsification identification data by applying a cryptographic mechanism to the data of at least one of the personal information and the captured image or video and the data of the control information, and then generates composite data by adding the forgery/falsification identification data to the data. Here, the encryption mechanism includes at least one of a hash function, a keyed-hash message authentication code (HMAC), a symmetric key, and a public key.

In one embodiment, the search link unit 150 is operated in connection with the flight history verification server 200 such that an optimum flight path for the unmanned aerial vehicle 1 is searched for in units of search conditions via a screen when the search link unit 150 is connected to the flight history verification server 200. Here, the search conditions include flight movement conditions, such as a safe shooting area, a shortest distance, a shortest time, and minimum complaints, and complex conditions, such as the type of an aerial vehicle, a weather condition, a battery capacity, and a loading capacity.

The automatic flight setter 160 receives an automatic control signal from the flight history verification server 200 so that the unmanned aerial vehicle 1 may be automatically flown without the pilot's control. That is, the unmanned aerial vehicle 1 may be automatically flown through flight setting by the pilot via the automatic flight setter 160 of the pilot terminal 100.

Referring back to FIG. 1, the flight history verification server 200 receives and stores registration information in advance from the pilot terminal 100 for personal authentication for the pilot who owns the unmanned aerial vehicle 1. Here, the registration information includes the pilot's personal information, photograph, and residence information, the unique identification number of the unmanned aerial vehicle 1, etc.

In one embodiment, the flight history verification server 200 receives flight information from the unmanned aerial vehicle 1 in real time or collects data stored in the unmanned aerial vehicle 1. More specifically, the flight history verification server 200 receives, in real time, or collects flight information, e.g., at least one among a flight position, a bearing, speed, acceleration, a rotation angle, taking-off/landing, a flight path, a flight direction, and an altitude, from the unmanned aerial vehicle 1.

In this case, the flight history verification server 200 determines whether the unmanned aerial vehicle 1 is controlled by the pilot, based on whether the control information which is encrypted data transmitted from the pilot terminal 100 and the flight information of the unmanned aerial vehicle 1 match each other.

In one embodiment, the flight history verification server 200 receives or collects the control information which is encrypted data transmitted from the pilot terminal 100, and identifies the pilot, based on whether the personal information and the previously stored registration information match each other.

The flight history verification server 200 may include the web server 210 or the flight history verification server 200 and the web server 210 may be configured to independently perform functions thereof.

Here, the web server 210 connects the pilot terminal 100 and the flight history verification server 200 via the network 10, and provides various online services from the flight history verification server 200 through a specific web page or an application related to an unmanned flight. For example, the online services provide at least one among the pilot's flight career certificate, an accident-free certificate, a pilot training completion time certificate, flight history management information, accident penalty point information, and a pilot completion time certificate to the pilot terminal 100, a government office (not shown), or an affiliated institution (not shown). Here, the affiliated institution is an institution that manages an unmanned aerial vehicle traffic management system.

In one embodiment, the flight history verification server 200 is operated in conjunction with a global satellite navigation system (not shown) or a geographic information system (not shown), and stores or updates information regarding at least one among an aerial shooting prohibited area, a flight restricted area, a flight area, an aerial shooting area, and an optimal flight path, and provides this information to the pilot terminal 100, a government office (not shown), or an affiliated institution (not shown) via the web server 210 when this information is requested therefrom.

In one embodiment, the flight history verification server 200 stores and manages weather information for each flight zone while being operated in conjunction with a weather service server (not shown), and determines whether a weather situation does not permit a flight by referring to the weather information for each flight zone.

In more detail, when receiving the control information from the pilot terminal 100, the flight history verification server 200 determines whether a weather situation does not permit a flight by referring to the weather information of each flight zone. For example, if it is determined that the weather situation does not permit a flight when the control information is received from the pilot terminal 100, the flight history verification server 200 registers the pilot as a person who deceives his or her control history.

Furthermore, the flight history verification server 200 receives the encrypted data from the pilot terminal 100 connected to the network 10, and stores and manages the pilot's personal information and control information.

In this case, the flight history verification server 200 further includes a database (DB) 300. Here, the DB 300 is a database used to record and manage the encrypted data of the pilot's personal information and the control information regarding control of the unmanned aerial vehicle 1 which are transmitted from the pilot terminal 100. This data is derived or updated with new data by the flight history verification server 200.

Such DBs may be embodied, for example, as a relational database management system (RDBMS), such as Oracle, Infomix, Sybase, or DB2, or an object-oriented database management system (OODBMS), such as Gemston, Orion, or O2, according to an aspect of the present disclosure, and have fields for achieving functions thereof.

As used herein, the term "DB" may refer to a functional and structural combination of software and hardware for storing data corresponding to each DB. The DB may be embodied as at least one table, and may further include a separate database management system (DBMS) for searching for, storing, and managing data stored in the DB. Alternatively, the DB may be embodied in various forms, such as a linked-list, a tree, and a relational DB, and may include various types of data storage media and data structures capable of storing data corresponding to the DB.

Figure 4:
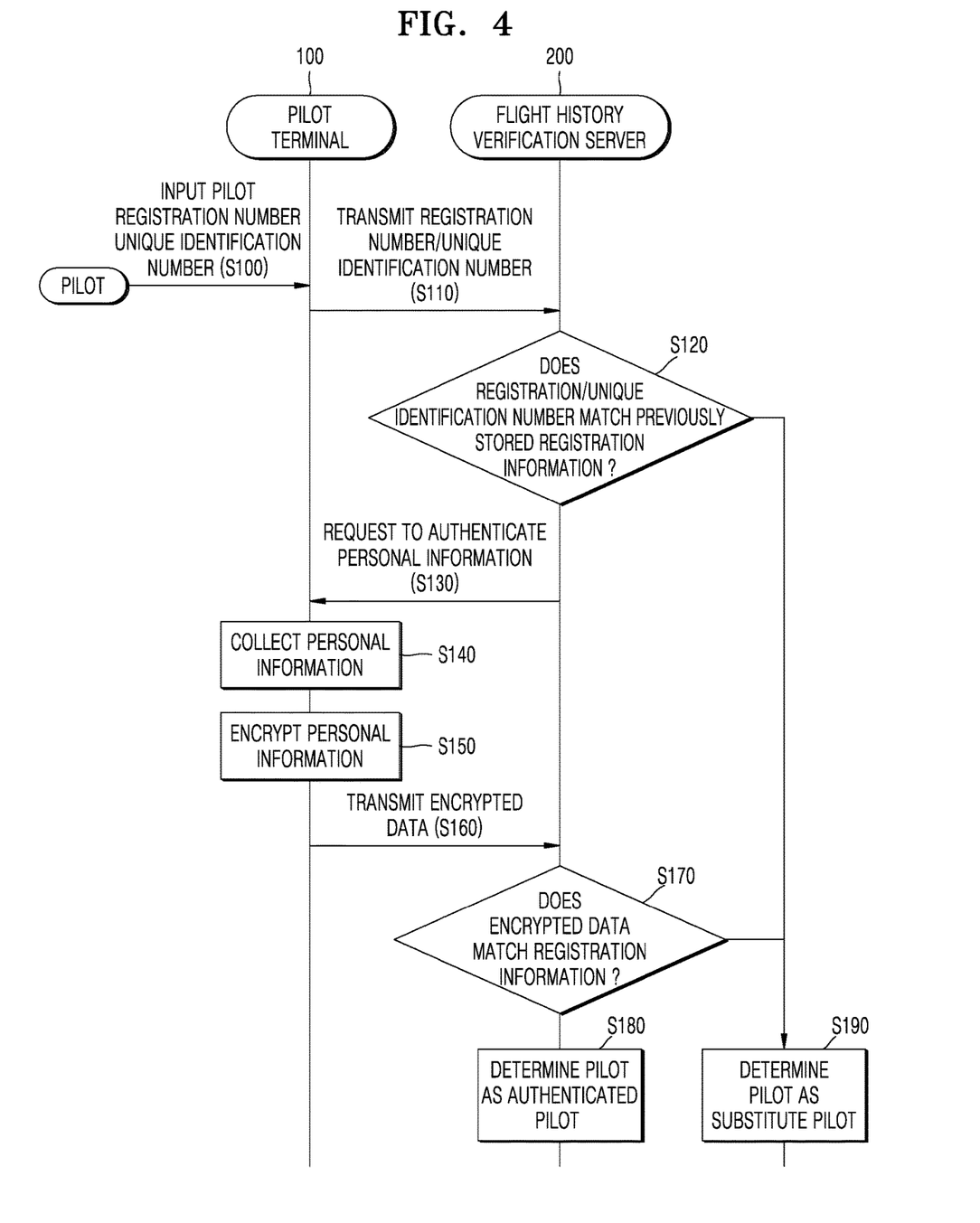
FIG. 4 is a diagram illustrating a process of verifying personal information, performed by an unmanned aerial vehicle control history verification system, according to an embodiment of the present disclosure.

FIG. 4 is a diagram illustrating a process of verifying personal information, performed by an unmanned aerial vehicle control history verification system, according to an embodiment.

Referring to FIGS. 1 to 4, the pilot terminal 100 receives a pilot registration number for flying the unmanned aerial vehicle 10 and the unique identification number of the unmanned aerial vehicle 10 from a pilot, and transmits them to the flight history verification server 200 (S100 and S110).

In this case, the flight history verification server 200 determines whether the pilot has made forgery or alteration according to whether the pilot registration number and the unique identification number transmitted from the pilot terminal 100 match the registration information stored in the DB 300 (S120).

The flight history verification server 200 determines that the pilot using the pilot terminal 100 is not a registered pilot when the pilot registration number and the unique identification number do not match the registration information stored in the DB 300 (S190).

The flight history verification server 200 requests the pilot terminal 100 to authenticate personal information when the pilot registration number and the unique identification number match the registration information stored in the DB 300 (S130).

In this case, the pilot terminal 100 collects the pilot's personal information by sensing the pilot's personal information via the sensors thereof and capturing an image of the pilot who controls the pilot terminal 100 via the camera thereof (S140), seals and encrypts data of the collected personal information and image (S150), and transmits the encrypted data to the flight history verification server 200 (S160).

Thereafter, the flight history verification server 200 identifies the pilot according to whether the encrypted data transmitted from the pilot terminal 100 matches the registration information stored in the DB 300 (S170).

That is, the flight history verification server 200 determines that the pilot using the pilot terminal 100 is an authenticated pilot when the personal information which is the encrypted data transmitted from the pilot terminal 100 and the registration information stored in the DB 300 match each other (S180), and determines the pilot as a substitute pilot when the personal information which is the encrypted data transmitted from the pilot terminal 100 and the registration information stored in the DB 300 do not match each other (S190).

Figure 5:
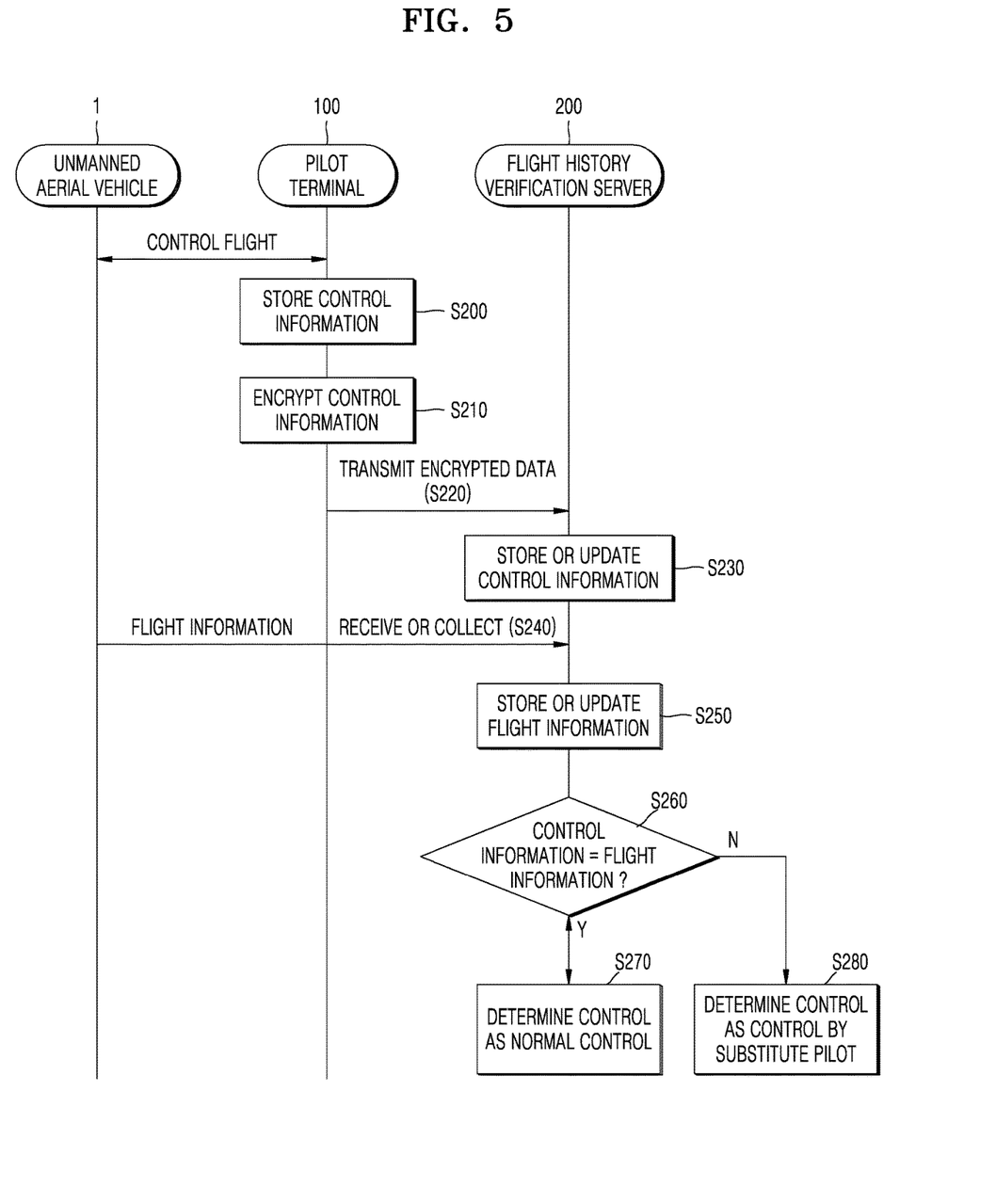
FIG. 5 is a diagram illustrating a process of verifying control information, performed by an unmanned aerial vehicle control history verification system, according to an embodiment of the present disclosure.

FIG. 5 illustrates a process of verifying control information, performed by an unmanned aerial vehicle control history verification system, according to an embodiment.

Referring to FIGS. 1 to 3 and 5, the pilot terminal 100 stores control information when the unmanned aerial vehicle 1 is controlled by a pilot (S200).

Next, the pilot terminal 100 seals and encrypts data of the stored control information, and transmits it to the flight history verification server 200 (S210 and S220).

Next, the flight history verification server 200 stores the encrypted data of the control information in the DB 300 or updates the encrypted data of the control information (S230).

Furthermore, the flight history verification server 200 receives data of flight information from the unmanned aerial vehicle 1 in real time or collects data of flight information stored in the unmanned aerial vehicle 1 (S240), and stores the received or collected flight information in the DB 300 or updates the received or collected flight information (S250).

In this case, the flight history verification server 200 determines whether the unmanned aerial vehicle 1 is controlled by a substitute pilot, based on whether the control information and the flight information match each other (S260).

That is, the flight history verification server 200 determines that the control by the pilot is normal control when the control information and the flight information match each other (S270), and determines that the control by the pilot is control by a substitute pilot who is not an actually registered pilot when the control information and the flight information do not match each other (S280).

The above-described unmanned aerial vehicle is not limited to the configurations and the methods employed in the embodiments set forth herein, and various modification may be made in these embodiments through selective combination of all or some parts thereof.

INDUSTRIAL APPLICABILITY

The present disclosure is applicable to industries related to a system for verifying control history of an unmanned aerial vehicle.

The invention claimed is:

1. A system for verifying control history of an unmanned aerial vehicle, the system comprising a pilot terminal,
   wherein the pilot terminal comprising at least one processor configured to implement:
   an authentication unit configured to collect personal information from a pilot who controls the unmanned aerial vehicle to authenticate the pilot; and
   an encryption unit configured to seal and encrypt data of the personal information and control information regarding the pilot's control of the unmanned aerial vehicle, the control information being stored in a storage,
   wherein the at least one processor is further configured to implement a communication unit configured to transmit the encrypted data to a flight history verification server,
   wherein the flight history verification server receives flight information from the unmanned aerial vehicle in real time or collects data stored in the unmanned aerial vehicle, and compares the flight information or the collected data with the encrypted data to determine whether data regarding a record of the control of the unmanned aerial vehicle is reliable, and
   wherein the flight history verification server compares the encrypted data and previously stored pilot registration information with each other to determine whether the unmanned aerial vehicle is controlled by a substitute pilot.

2. The system of claim 1, wherein the authentication unit comprises:
   a sensor unit configured to sense the personal information via sensors thereof; and
   a shooting unit configured to capture an image or video of the pilot who controls the unmanned aerial vehicle.

3. The system of claim 1, wherein the at least one processor is further configured to implement:
   a search link unit configured to be operated in conjunction with the flight history verification server via a network to search for an optimum flight path for the unmanned aerial vehicle; and
   an automatic flight setter configured to receive an automatic control signal from the flight history verification server to cause the unmanned aerial vehicle to be automatically flown without the pilot's control.

* * * * *